United States Patent
Chang et al.

(10) Patent No.: US 9,454,989 B1
(45) Date of Patent: Sep. 27, 2016

(54) DISK DRIVE ADJUSTING ESTIMATED SERVO STATE TO COMPENSATE FOR TRANSIENT WHEN CROSSING A SERVO ZONE BOUNDARY

(71) Applicant: Western Digital Technologies, Inc., Irvine, CA (US)

(72) Inventors: Michael Chang, San Jose, CA (US); Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/644,415

(22) Filed: Mar. 11, 2015

Related U.S. Application Data

(62) Division of application No. 13/529,958, filed on Jun. 21, 2012, now Pat. No. 8,995,075.

(51) Int. Cl.
| | |
|---|---|
| G11B 5/596 | (2006.01) |
| G11B 20/10 | (2006.01) |
| G11B 5/55 | (2006.01) |
| G11B 20/12 | (2006.01) |
| G11B 5/012 | (2006.01) |

(52) U.S. Cl.
CPC ....... G11B 20/10222 (2013.01); G11B 5/5534 (2013.01); G11B 5/59622 (2013.01); G11B 20/10046 (2013.01); G11B 5/012 (2013.01); G11B 5/5543 (2013.01); G11B 5/596 (2013.01); G11B 5/59655 (2013.01); G11B 5/59688 (2013.01); G11B 20/1217 (2013.01); G11B 2020/1232 (2013.01); G11B 2020/1242 (2013.01); G11B 2020/1281 (2013.01)

(58) Field of Classification Search
None
See application file for complete search history.

(56) References Cited

U.S. PATENT DOCUMENTS

| | | |
|---|---|---|
| 5,208,556 A | 5/1993 | Wilson |
| 5,384,671 A | 1/1995 | Fisher |
| 5,418,659 A | 5/1995 | Shergill |
| 5,739,994 A | 4/1998 | Ottesen et al. |
| 5,796,535 A | 8/1998 | Tuttle et al. |
| 5,861,766 A | 1/1999 | Baumer et al. |
| 5,956,196 A | 9/1999 | Hull et al. |
| 6,014,283 A | 1/2000 | Codilian et al. |
| 6,028,727 A | 2/2000 | Vishakhadatta et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,084,738 A | 7/2000 | Duffy |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,118,604 A | 9/2000 | Duffy |
| 6,122,133 A | 9/2000 | Nazarian et al. |

(Continued)

*Primary Examiner* — Brian Butcher

(57) ABSTRACT

A disk drive is disclosed comprising a disk comprising a plurality of servo sectors defining a plurality of servo tracks. The servo tracks form a plurality of servo zones, where a servo data rate of servo sectors in a first servo zone is different than a servo data rate of servo sectors in a second servo zone. A servo control system servos a head over the disk. An estimated servo state of a servo control system is generated, and when the head crosses from a first servo zone to a second servo zone, the estimated servo state is adjusted to compensate for a transient in a circumferential distance between a servo sector in the first servo zone and a servo sector in the second servo zone.

6 Claims, 5 Drawing Sheets

(56) References Cited

U.S. PATENT DOCUMENTS

| | | |
|---|---|---|
| 6,122,135 A | 9/2000 | Stich |
| 6,141,175 A | 10/2000 | Nazarian et al. |
| 6,160,368 A | 12/2000 | Plutowski |
| 6,178,056 B1 | 1/2001 | Cloke et al. |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,262,857 B1 | 7/2001 | Hull et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,388,829 B1 | 5/2002 | Nazarian |
| 6,411,452 B1 | 6/2002 | Cloke |
| 6,441,981 B1 | 8/2002 | Cloke et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,519,104 B1 | 2/2003 | Cloke et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,628,171 B1 | 9/2003 | Chou et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,873,483 B2 | 3/2005 | Hetzler et al. |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,943,978 B1 | 9/2005 | Lee |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,992,856 B2 | 1/2006 | Ehrlich |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,316 B1 | 2/2006 | Sargenti, Jr. et al. |
| 7,006,320 B1 | 2/2006 | Bennett et al. |
| 7,012,773 B2 | 3/2006 | Ashikaga et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,083 B2 | 5/2006 | Ehrlich |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,072,128 B2 | 7/2006 | Ehrlich |
| 7,075,742 B2 | 7/2006 | Ehrlich |
| 7,088,547 B1 | 8/2006 | Wang et al. |
| 7,092,177 B2 | 8/2006 | Ehrlich |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |

(56) References Cited

U.S. PATENT DOCUMENTS

| | | |
|---|---|---|
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,286 B2 | 2/2008 | Jung et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,388,817 B2 | 6/2008 | Tsunoda |
| 7,391,583 B1 | 6/2008 | Sheh et al. |
| 7,391,584 B1 | 6/2008 | Sheh et al. |
| 7,405,893 B2 | 7/2008 | Bi et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,535,805 B2 | 5/2009 | Hsin |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,074 B2 | 6/2010 | Venkataramani et al. |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,813,065 B2 | 10/2010 | Annampedu et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,022,774 B2 | 9/2011 | Ueno et al. |
| 8,031,423 B1 | 10/2011 | Tsai et al. |
| 8,031,429 B2 | 10/2011 | Gerasimov |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,120,868 B2 | 2/2012 | Bi et al. |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |

(56) References Cited

U.S. PATENT DOCUMENTS

| | | | |
|---|---|---|---|
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2003/0086196 A1 | 5/2003 | Morris et al. |
| 2004/0160696 A1 | 8/2004 | Meyer |
| 2007/0047132 A1 | 3/2007 | Sado et al. |
| 2007/0064325 A1 | 3/2007 | Bi et al. |
| 2007/0081268 A1 | 4/2007 | Jung et al. |
| 2007/0211367 A1 | 9/2007 | Lau et al. |
| 2007/0211369 A1 | 9/2007 | Yang et al. |
| 2008/0002279 A1 | 1/2008 | Kouhara et al. |
| 2008/0239556 A1 | 10/2008 | Wiseman et al. |
| 2009/0086357 A1 | 4/2009 | Ehrlich |
| 2010/0035085 A1 | 2/2010 | Jung et al. |
| 2010/0142077 A1 | 6/2010 | Zaitsu et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0329313 A1* | 12/2013 | Zhang ............... G11B 5/59655 360/51 |

\* cited by examiner

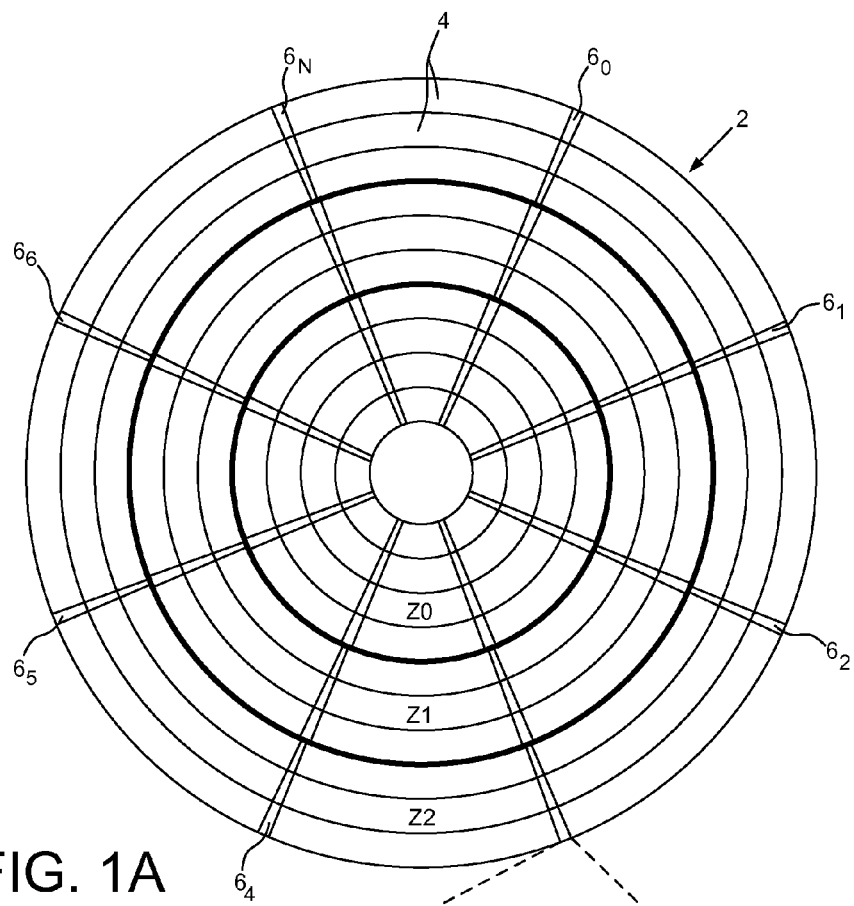
FIG. 1A
(Prior Art)
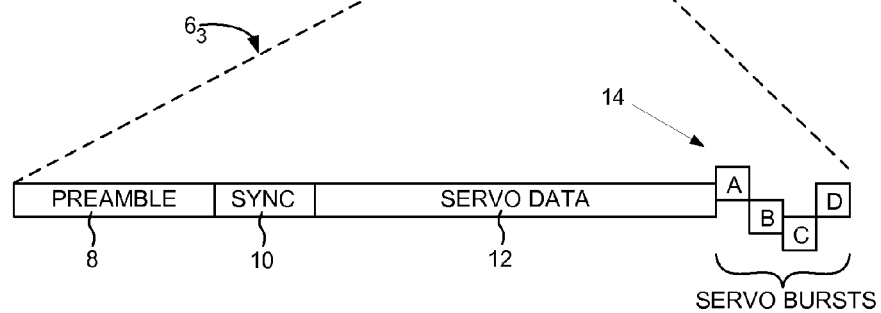
FIG. 1B
(Prior Art)

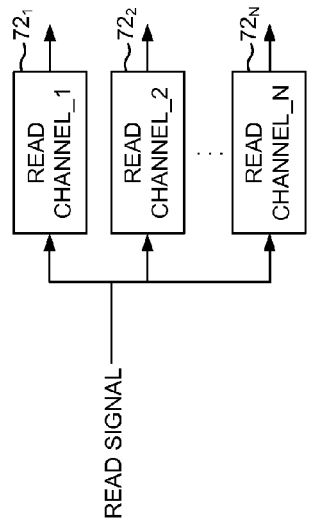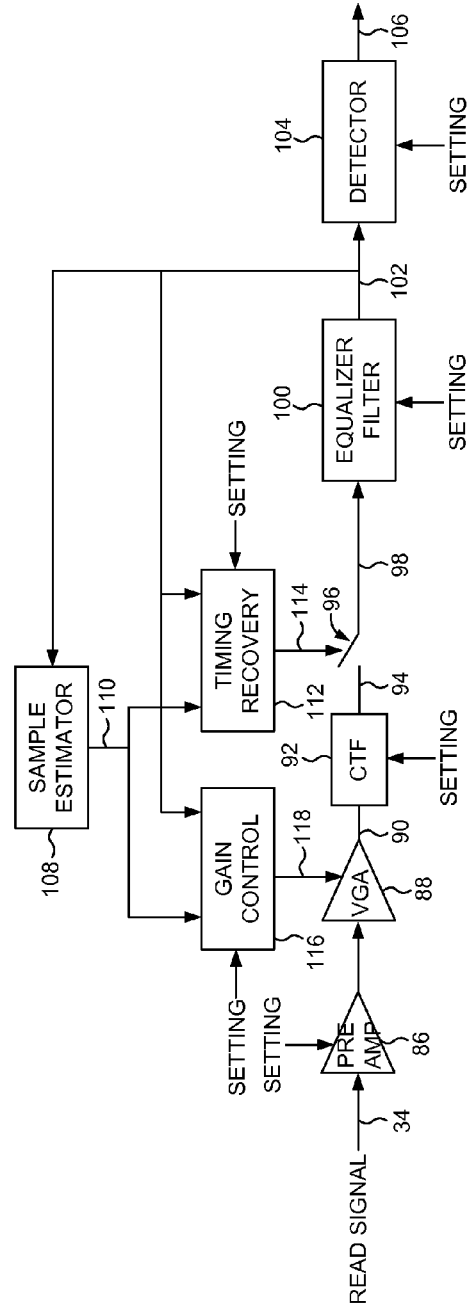

DISK DRIVE ADJUSTING ESTIMATED SERVO STATE TO COMPENSATE FOR TRANSIENT WHEN CROSSING A SERVO ZONE BOUNDARY

CROSS REFERENCE TO RELATED APPLICATIONS

This application is a divisional of U.S. patent application Ser. No. 13/529,958 filed on Jun. 21, 2012, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1A, which shows a prior art disk format 2 comprising a number of data tracks 4, wherein the data tracks are banded together in this example to form three physical zones from the inner diameter of the disk (Z0) to the outer diameter of the disk (Z2).

The prior art disk format of FIG. 1A also comprises a number of servo sectors $6_0$-$6_N$ recorded around the circumference of the disk 2 that define a plurality of servo tracks, wherein the data tracks 4 are defined relative to the servo tracks. Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

To facilitate demodulating the servo sectors $6_0$-$6_N$, a timing control loop generates a disk locked clock synchronized to the data rate of the servo sectors $6_0$-$6_N$. The disk locked clock generates suitable timing information, such as a servo gate that times the circumferential location of the servo sectors $6_0$-$6_N$, and a sync window that times the circumferential location of the sync marks 10 within the servo sectors $6_0$-$6_N$ as shown in FIG. 1B. In the embodiment of FIG. 1A, the data rate of the servo sectors $6_0$-$6_N$ changes in each physical zone similar to the data sectors in order to improve format efficiency.

BRIEF DESCRIPTION OF THE DRAWINGS

FIG. 1A shows a prior art disk format comprising a plurality of servo zones defined by servo sectors recorded at varying data rates.

FIG. 1B shows prior art servo timing signals, including a servo gate and a sync window.

FIG. 5A shows an embodiment of the present invention wherein the disk drive comprises a plurality of read channels programmed with unique configurations.

FIG. 5B shows a read channel comprising programmable components according to an embodiment of the present invention.

DETAILED DESCRIPTION

Figure 2A:
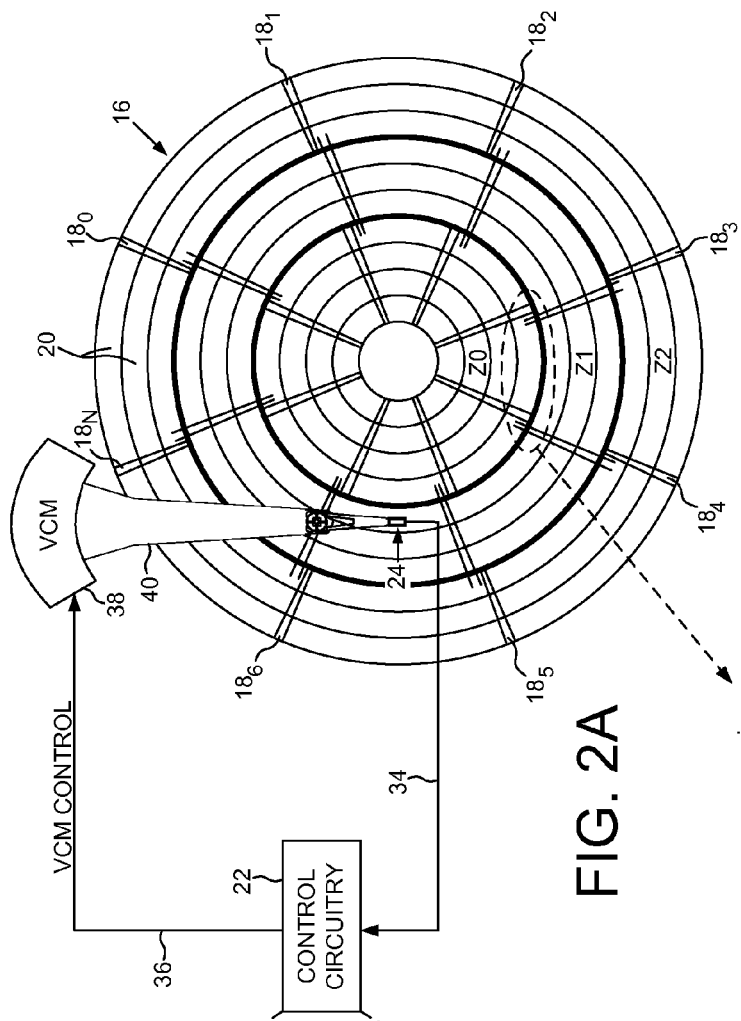
FIG. 2A shows a disk drive according to an embodiment of the present invention comprising a head actuated over a disk comprising zoned servo sectors.
Figure 2B:
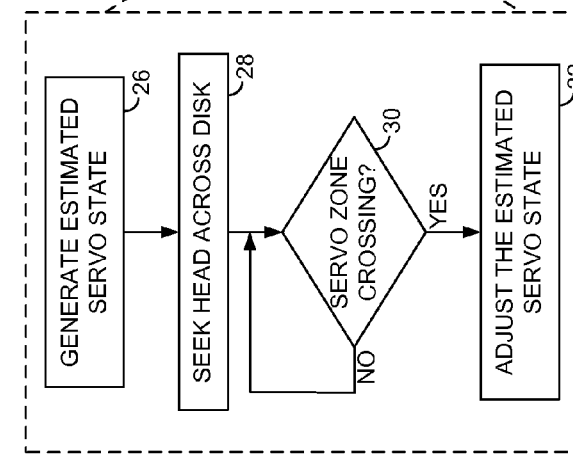
FIG. 2B is a flow diagram according to an embodiment of the present invention wherein during a servo zone crossing an estimated state of a servo control system is adjusted to compensate for a transient in a circumferential distance between a servo sector in the first servo zone and a servo sector in the second servo zone.

FIG. 2A shows a disk drive comprising a disk 16 comprising a plurality of servo sectors $18_0$-$18_N$ defining a plurality of servo tracks 20. The servo tracks 20 form a plurality of servo zones (Z0-Z2), where a servo data rate of servo sectors in a first servo zone is different than a servo data rate of servo sectors in a second servo zone. The disk drive further comprises control circuitry 22 comprising a servo control system operable to servo a head 24 over the disk 16. The control circuitry 22 is operable to execute the flow diagram of FIG. 2B wherein an estimated servo state of the servo control system is generated (block 26) while seeking the head over the disk (block 28). When the head crosses from the first servo zone to the second servo zone (block 30), the estimated servo state is adjusted (block 32) to compensate for a transient in a circumferential distance between a servo sector in the first servo zone and a servo sector in the second servo zone.

In the embodiment of FIG. 2A the control circuitry 22 processes a read signal 34 emanating from the head 24 to demodulate the servo sectors $18_0$-$18_N$ and generate a position error signal (PES) representing an error between the actual position of the head and a target position relative to a target track. The control circuitry 22 filters the PES using suitable compensation filters to generate a control signal 36 applied to a voice coil motor (VCM) 38 which rotates an actuator arm 40 about a pivot, thereby actuating the head 24 radially over the disk 16 in a direction that reduces the PES. The servo sectors $18_0$-$18_N$ may comprise any suitable position information, such as a track and wedge address for coarse positioning and servo bursts for fine positioning as described above with reference to FIG. 1A. The servo bursts may comprise any suitable pattern, such as an amplitude based servo pattern as shown in FIG. 1A, or a suitable phase based servo pattern.

Figure 2C:
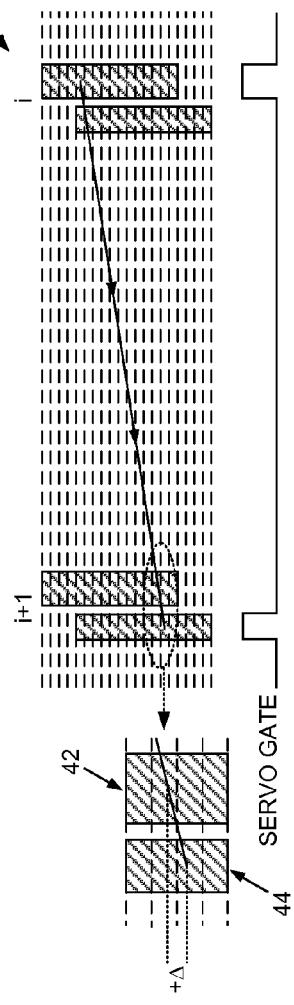
FIG. 2C illustrates an embodiment of the present invention wherein an estimated radial position of the head is increased during a servo zone crossing to compensate for an increase in the interval between consecutive servo sectors.

In the embodiment of FIG. 2A, a boundary of a first servo zone (e.g., Z0) overlaps with a boundary of a second servo zone (e.g., Z1) over a transition zone, and the servo sectors of the first servo zone are interleaved with the servo sectors of the second servo zone within the transition zone as illustrated in FIG. 2C. The overlapped servo sectors in the transition zone facilitates switching between the first servo zone and the second servo zone during a seek operation. In the example shown in FIG. 2C, the head 24 is seeking across the disk 16 from servo zone Z0 to servo zone Z1. When the head 24 reaches the transition zone, the servo timing is adjusted to delay the servo gate so as to read the servo sector in servo zone Z1 (instead of the servo sector in servo zone Z0). The adjustment increases the interval between consecutive servo sectors which introduces a delta in the estimated state of the servo control system, such as an estimated radial position of the head. This is illustrated in FIG. 2C wherein a state estimator may estimate the radial position of the head at the next servo sector i+1 based on the servo sector 42 in servo zone Z0. However, since the servo timing is adjusted to read the servo sector 44 in servo zone Z1, there is a corresponding radial position delta (+Δ) that is added to the estimated radial position of the head in order to compensate for the transient.

Figure 3:
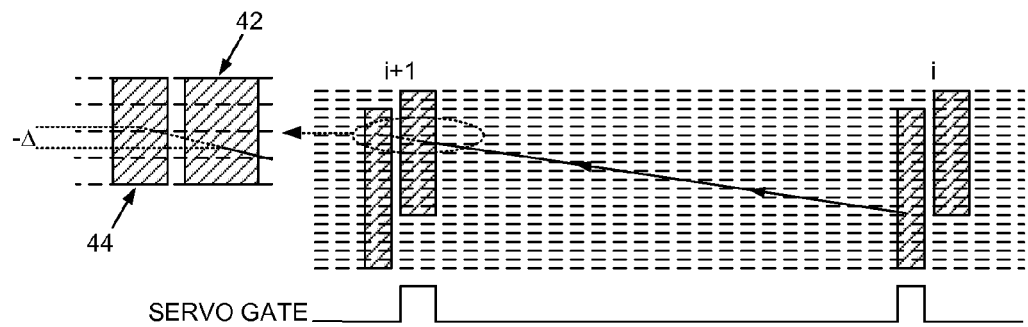
FIG. 3 illustrates an embodiment of the present invention wherein an estimated radial position of the head is decreased during a servo zone crossing to compensate for a decrease in the interval between consecutive servo sectors.

FIG. 3 shows an example wherein when seeking the head from servo zone Z1 to servo zone Z0, the servo sector 42 in servo zone Z0 is reached sooner than the servo sector 44 in servo zone Z1. There is therefore a corresponding radial position delta (−Δ) that is subtracted from the estimated radial position of the head in order to compensate for the transient.

Figure 4:
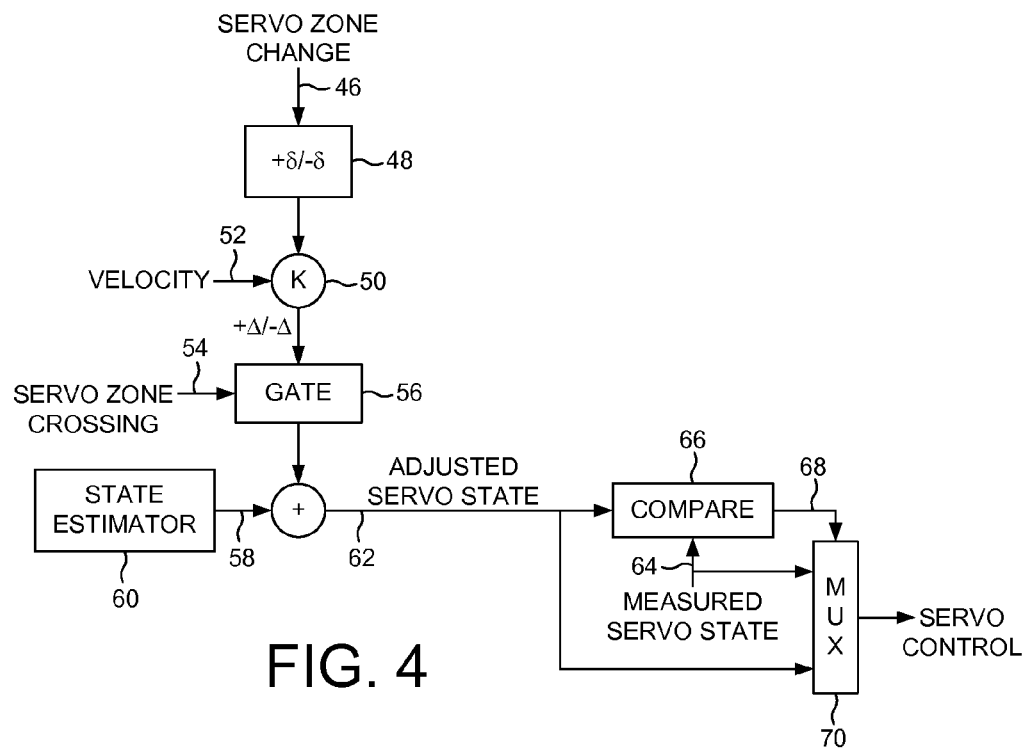
FIG. 4 shows an embodiment of the present invention wherein during a servo zone crossing the estimated radial position of the head is adjusted based on an estimated radial velocity of the head.

In one embodiment, the estimated position of the head is adjusting during a servo zone crossing based on an estimated radial velocity of the head. This is because the magnitude of the radial position delta (Δ) in FIG. 2C and FIG. 3 is proportional to the radial velocity of the head; that is, the higher the radial velocity the more significant the adjustment to the estimated radial position. FIG. 4 illustrates this embodiment wherein a control signal 46 selects a time delta +δ or −δ 48 depending on the direction of the servo zone crossing, where the time delta δ represents the time transient (positive or negative) due to the transient in the interval between a servo sector in the first servo zone and a servo sector in the second servo zone as described above. The selected time delta is scaled by a scalar 50 having a magnitude based on the estimated radial velocity 52 of the head. The resulting scaled radial position delta +Δ or −Δ is enabled by control signal 54 through gate 56 during the transition to the next servo zone. The scaled radial position delta +Δ or −Δ is added to an estimated radial position 58 generated by a state estimator 60 to generate an adjusted estimated radial position 62.

FIG. 4 also illustrates an embodiment of the present invention wherein a measured position 64 of the head is generated from the position information derived from reading a servo sector. The adjusted estimated radial location 62 is compared 66 to the measured radial location 64, and the result 68 used to control a multiplexer 70. If the difference between the adjusted estimated radial location 62 and the measured radial location 64 is less than a threshold, then the servo control system uses the measured radial location 64 to servo the head over the disk. If the difference is greater than the threshold, then the measured radial location 64 is deemed unreliable (e.g., due to reading a defective servo sector) and therefore the adjusted estimated radial location 62 is used to servo the head over the disk.

Any suitable estimated servo state may be adjusted in the embodiments of the present invention when transitioning between servo zones (instead of, or in addition to the estimated position of the head). The adjustment to the estimated servo state(s) may be generalized by considering the equations that define the servo control system. Consider a simple continuous-time rigid-body state-space model $$\frac{1}{s^2}$$

represented in continuous-time by:

$$\dot{x} = Ax + Bu$$

$$y = Cx + Du$$

where:

$$\left[\begin{array}{c|c} A & B \\ \hline C & D \end{array}\right] = \left[\begin{array}{cc|c} 0 & 1 & 0 \\ 0 & 0 & \gamma \\ \hline 1 & 0 & 0 \end{array}\right]$$

with the radial position and velocity of the head denoted by $x_1$ and $x_2$ respectively. The above continuous-time equation can be transformed into discrete-time assuming a nominal sampling period of T and a 4× multi-rate zero-order-hold (ZOH) control system with values denoted by $u_1$, $u_2$, $u_3$, and $u_4$ for the respective time intervals given by:

$$\left[t_0, t_0 + \frac{T}{4}\right), \left[t_0 + \frac{T}{4}, t_0 + \frac{T}{2}\right), \left[t_0 + \frac{T}{2},\right.$$

$$\left. t_0 + \frac{3T}{4}\right), \left[t_0 + \frac{3T}{4}, t_0 + T + \delta\right) \text{ then}$$

$$\tilde{x}(t_0 + T + \delta) = \underbrace{\begin{bmatrix} 1 & \frac{T+\delta}{T} \\ 0 & 1 \end{bmatrix}}_{\tilde{A}_d} \tilde{x}(t_0) +$$

$$\underbrace{\gamma \begin{bmatrix} \frac{7}{32} + \frac{\delta}{4T} & \frac{5}{32} + \frac{\delta}{4T} & \frac{3}{32} + \frac{\delta}{4T} & \frac{(T+4\delta)^2}{32T^2} \\ \frac{1}{4} & \frac{1}{4} & \frac{1}{4} & \frac{1}{4} + \frac{\delta}{T} \end{bmatrix}}_{\tilde{B}_d} \underbrace{\begin{bmatrix} \tilde{u}_1 \\ \tilde{u}_2 \\ \tilde{u}_3 \\ \tilde{u}_4 \end{bmatrix}}_{\tilde{u}} \text{ where}$$

$$S_x = \begin{bmatrix} r\alpha & 0 \\ 0 & rT\alpha \end{bmatrix}, S_u = [rT^2\alpha], \tilde{x} = S_x x, \tilde{u} = S_u u$$

r represents the VCM 38 actuator arm 40 length (e.g., inches) from the pivot point to the head 24, and α represents radial track density units (e.g., tracks per inch), thereby normalizing the position and velocity states $\tilde{x}$ to respective units of servo tracks and servo tracks/sample. In the above equations, γ represents the gain of the servo actuator (e.g., VCM). The above equations demonstrate how the time delta δ can be used to adjust the estimated servo states during a servo zone crossing (i.e., adjust the estimated radial position and the estimated radial velocity in this embodiment).

In one embodiment, the data tracks are also banded together to define data zones, wherein the user data rate is increased toward the outer diameter zones in order to improve the format efficiency. The number of data zones may equal the number of servo zones, or the number of data zones may be less than or greater than the number of servo zones. The boundaries of the data zones may align with the boundary of a servo zone, or the data zone boundaries may be located at radial locations different from the boundaries of the servo zones. In the embodiment shown in FIG. 2A the servo sectors are offset circumferentially between the servo zones to facilitate overlapping the servo sectors. In another embodiment, the servo sectors may be aligned across the servo zones without overlapping the servo sectors similar to the format shown in FIG. 1A.

Figure 6:
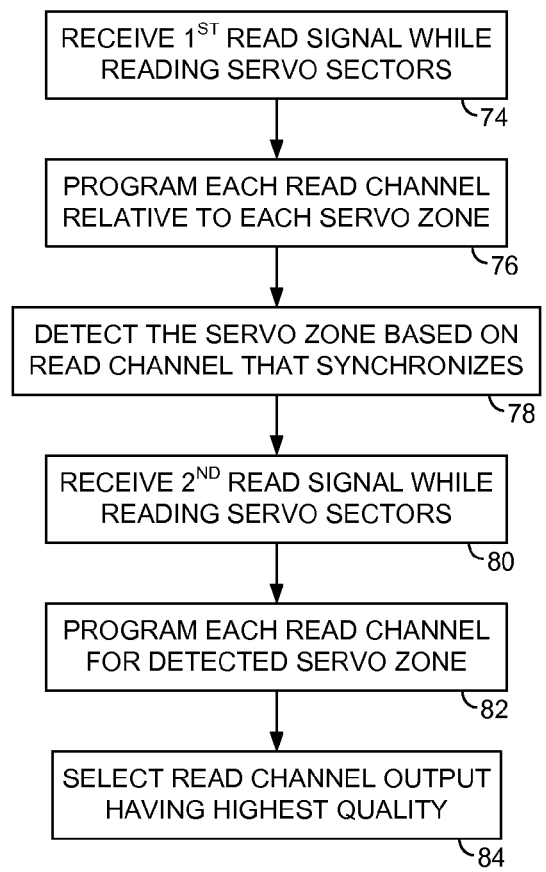
FIG. 6 is a flow diagram according to an embodiment of the present invention wherein the read channels are programmed relative to each servo zone when detecting the servo zone the head is over, or programmed with different data detection propensities when reading servo data during an access operation.

FIG. 5A shows an embodiment of the present invention wherein the control circuitry 22 of the disk drive comprises a plurality of read channels $72_1$-$72_N$. The control circuitry 22 is further operable to execute the flow diagram shown in FIG. 6, wherein a first read signal is received from the head while reading servo data from the servo sectors (block 74), and each read channel is programmed with a unique configuration to process the first read signal in parallel (block 76), wherein each configuration corresponds to a servo data rate of a respective servo zone so that the current servo zone the head is over can be determined (block 78). A second read signal is received from the head while reading servo data from the disk (block 80), and each read channel is programmed with a unique configuration (block 82) to process the second read signal in parallel, wherein each configuration has a different propensity to recover the servo data. In the embodiment of FIG. 6, the read channel having the highest quality output is selected for use by the servo control system (block 84). Accordingly, in the embodiment of FIG. 6 the first read signal is generated when detecting the current servo zone the head is over, and the second read signal is generated when attempting to read the servo data in the current servo zone.

Each read channel $72_i$ in the embodiment of FIG. 5A may comprise any suitable components, where FIG. 5B shows an example read channel comprising suitable gain control and timing recovery circuitry. The gain control circuitry comprises a preamp 86 and a variable gain amplifier (VGA) 88 that amplifies the read signal 34 to generate an amplified read signal 90. The amplified read signal 90 is filtered with a continuous time filter (CTF) 92 in order to equalize the amplified read signal 90 according to a target response (e.g., a target partial response such as PR4, EPR4, etc.). The output 94 of the CTF 92 is sampled by a sampling device 96 to generate discrete-time read signal samples 98. An equalizer filter 100 equalizes the read signal samples 98 according to the target response to generate equalized samples 102. A detector 104 (e.g., a Viterbi detector) processes the equalized samples 102 to generate a data sequence 106 representing the detected servo data. A sample estimator 108 (e.g., a slicer) estimates a target sample value 110 from an equalized sample value 102. The target sample value 110 and equalized sample value 102 are processed by timing recovery 112 to synchronize a disk locked clock 114 to the data rate of the servo data, and processed by gain control 116 to generate a VGA gain setting 118 for adjusting the gain of the VGA 88. Other embodiments may employ interpolated timing recovery wherein synchronous read signal samples are generated by interpolating asynchronous read signal samples.

When processing the read signal 34 to determine the current servo zone the head is over, the control circuitry 22 programs the components of the read channel shown in FIG. 5B according to different possible servo zones. For example, the control circuitry 22 may program the equalizer filter 100 with different coefficients that may provide optimal equalization depending on the servo zone (the coefficients may be pre-calibrated). In another embodiment, the control circuitry 22 may program the timing recovery 112 in order to synchronize the respective disk locked clocks to the respective servo data rates of the servo zones. For example, the control circuitry 22 may program a center frequency of a phased-locked loop (PLL) with a value corresponding to the servo data rates of the servo zones. In one embodiment, the current servo zone the head is over is determined by the read channel that successfully synchronizes the respective disk locked clock to the servo data rate of the servo zone the head is over (for example, successfully detects the sync mark in the servo sectors after synchronizing to the preamble).

Once the current servo zone has been determined, the read signal 34 may be processed in parallel by the read channels $72_1$-$72_N$ in order to reliably detect the servo data in the servo sectors. The components in each read channel $72_i$ may be programmed into different configurations each having a different propensity to recover the servo data. For example, each equalizer filter 100 may be programmed with different coefficients in order to equalize the read signal samples 98 into different responses, wherein one of the responses will likely be closest to the target response. Similarly, the timing recovery 112 and/or gain control 116 may be programmed into different configurations to provide a range of performance propensities. When processing the read signal 34 in parallel, a suitable quality metric is measured to determine which read channel is providing the best performance (and therefore the most reliable output). Any suitable quality metric may be measured, such as measuring a mean squared error between the equalized samples 102 and target samples of the target response. Other quality metrics may include an accumulated timing recovery error, an accumulated gain control error, or a metric generated by the detector 104.

In one embodiment, one or more of the read channels $72_1$-$72_N$ may be programmed with suboptimal values in order to detune the read channel. The output of the detuned read channel(s) may then be evaluated to help verify the reliability of the read channel selected to output the detected servo data to the servo control system. For example, errors in the detected servo data may be identified by comparing the outputs of the read channels (where a mismatch represents an error). If the number of errors exceeds a threshold, the output of the selected read channel may be considered unreliable and the selected servo data discarded.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo sectors defining a plurality of servo tracks, wherein:
   the servo tracks form a plurality of servo zones; and
   a servo data rate of servo sectors in a first servo zone is different than a servo data rate of servo sectors in a second servo zone;
   a head actuated radially over the disk; and
   control circuitry comprising a plurality of read channels where each read channel comprises an equalizer configured to equalize signal samples of the second read signal to generate equalized samples, the control circuitry operable to:
   receive a first read signal from the head while reading servo data from the servo sectors;
   program each read channel with a unique configuration to process the first read signal in parallel, wherein each configuration corresponds to a servo data rate of a respective servo zone;
   receive a second read signal from the head while reading servo data from the disk; and
   program the equalizer of each read channel with a unique configuration to process the second read signal in parallel, wherein each configuration has a different propensity to recover the servo data from the equalized samples.

2. The disk drive as recited in claim 1, wherein:
   each read channel comprises a timing recovery circuit;
   each timing recovery circuit generates a respective disk locked clock to a servo data rate;
   the control circuitry is further operable to program the timing recovery circuit of each read channel with the unique configuration to process the first read signal in parallel; and
   each configuration attempts to synchronize the respective disk locked clocks to the respective servo data rates of the servo zones.

3. The disk drive as recited in claim 2, wherein the control circuitry is further operable to detect the servo zone the head is over in response to the read channel that successfully synchronizes the respective disk locked clock to the servo data rate of the servo zone the head is over.

4. A method of operating a disk drive, the disk drive comprising a head actuated over a disk comprising a plurality of servo sectors defining a plurality of servo tracks, and a plurality of read channels, wherein each read channel comprises an equalizer configured to equalize signal samples of the second read signal to generate equalized samples, the servo tracks form a plurality of servo zones, and a servo data rate of servo sectors in a first servo zone is different than a servo data rate of servo sectors in a second servo zone, the method comprising:
   receiving a first read signal from the head while reading servo data from the servo sectors;
   programming each read channel with a unique configuration to process the first read signal in parallel, wherein each configuration corresponds to a servo data rate of a respective servo zone;
   receiving a second read signal from the head while reading servo data from the disk; and
   programming the equalizer of each read channel with a unique configuration to process the second read signal in parallel, wherein each configuration has a different propensity to recover the servo data from the equalized samples.

5. The method as recited in claim 4, wherein:
   each read channel comprises a timing recovery circuit;
   each timing recovery circuit generates a respective disk locked clock to a servo data rate;
   the method further comprises programming the timing recovery circuit of each read channel with the unique configuration to process the first read signal in parallel; and
   each configuration attempts to synchronize the respective disk locked clocks to the respective servo data rates of the servo zones.

6. The method as recited in claim 5, further comprising detecting the servo zone the head is over in response to the read channel that successfully synchronizes the respective disk locked clock to the servo data rate of the servo zone the head is over.

* * * * *